US008315932B2

(12) United States Patent
Burrows et al.

(10) Patent No.: US 8,315,932 B2
(45) Date of Patent: Nov. 20, 2012

(54) NEWS INDUCED AUTOMATED ELECTRONIC SECURITIES TRANSACTIONS

(75) Inventors: Steven A. Burrows, Lake Oswego, OR (US); John Elliott, Wilsonville, OR (US)

(73) Assignee: News Technologies LLC, Lake Oswego, OR (US)

( * ) Notice: Subject to any disclaimer, the term of this patent is extended or adjusted under 35 U.S.C. 154(b) by 0 days.

(21) Appl. No.: 13/174,581

(22) Filed: Jun. 30, 2011

(65) Prior Publication Data

US 2012/0011047 A1 Jan. 12, 2012

Related U.S. Application Data

(63) Continuation of application No. 10/321,124, filed on Dec. 16, 2002, now Pat. No. 8,027,893.

(60) Provisional application No. 60/384,616, filed on May 29, 2002, provisional application No. 60/382,071, filed on May 20, 2002.

(51) Int. Cl.
*G06Q 40/00* (2012.01)
(52) U.S. Cl. ............. 705/35; 705/36 R; 705/37; 705/38; 705/39; 705/40; 705/41; 705/42; 705/43; 705/44; 705/45
(58) Field of Classification Search .................. 705/35, 705/36 R, 37–45
See application file for complete search history.

(56) References Cited

U.S. PATENT DOCUMENTS

| 5,347,452 | A | 9/1994 | Bay |
| 6,023,723 | A | 2/2000 | McCormick et al. |
| 6,029,195 | A | 2/2000 | Herz |
| 6,260,050 | B1 | 7/2001 | Yost et al. |
| 6,377,949 | B1 | 4/2002 | Gilmour |
| 6,505,196 | B2 | 1/2003 | Drucker et al. |
| 6,587,835 | B1 | 7/2003 | Treyz et al. |
| 6,594,643 | B1 | 7/2003 | Freeny |
| 6,615,188 | B1 | 9/2003 | Breen et al. |
| 6,709,330 | B1 | 3/2004 | Klein et al. |
| 6,745,161 | B1 | 6/2004 | Arnold et al. |
| 6,766,328 | B2 | 7/2004 | Stefanchik et al. |
| 6,839,686 | B1 | 1/2005 | Galant |
| 6,925,605 | B2 | 8/2005 | Bates et al. |
| 7,185,065 | B1 | 2/2007 | Holtzman et al. |
| 7,277,887 | B1 | 10/2007 | Burrows et al. |
| 2002/0095362 | A1 | 7/2002 | Masand et al. |
| 2002/0152151 | A1 | 10/2002 | Baughman et al. |

(Continued)

FOREIGN PATENT DOCUMENTS

WO    WO01-022337    3/2001

OTHER PUBLICATIONS

Hinze, et al, A Unified Model of Internet Scale Alerting Services; in L.C.K. Hui and D.L. Lee, editors, Internet Applications, 5th Int'l Computer Science Conference, ICSD '99, vol. 1749 of LNCS, pp. 2840-293; 1999.

(Continued)

*Primary Examiner* — Daniel Felten
(74) *Attorney, Agent, or Firm* — Schwabe Williamson & Wyatt

(57) ABSTRACT

News information is received. It is determined if the news information contains a reference to a company. It is further determined if the news information matches criteria associated with the company. Securities are automatically trade upon determining that said news information contains a reference to the company and determining that said news information matches criteria associated with the company.

24 Claims, 6 Drawing Sheets

U.S. PATENT DOCUMENTS

2002/0173961 A1 11/2002 Guerra
2003/0069834 A1 4/2003 Cutler

OTHER PUBLICATIONS

Gauch, et al, Journal of Universal Computer Science, 2(9), 1996, pp. 1-12.
Non-Final Office Action re U.S. Appl. No. 10/321,124 dated Oct. 14, 2010.
Non-Final Office Action re U.S. Appl. No. 10/321,124 dated Apr. 28, 2010.
Final Office Action re U.S. Appl. No. 10/321,124 dated Dec. 3, 2009.
Non-Final Office Action re U.S. Appl. No. 10/321,124 dated Apr. 14, 2009.
Final Office Action re U.S. Appl. No. 10/321,124 dated Jun. 25, 2008.
Non-Final Office Action re U.S. Appl. No. 10/321,124 dated Sep. 11, 2007.

| Match term or phrase 410 | Company Name 420 | Company Symbol 430 | Buy Price 440 | # Shares 450 | Profit Limit (%) 460 | Loss Limit (%) 470 | Time Limit 480 |
|---|---|---|---|---|---|---|---|
| stock split | <ANY> | <ANY> | MKT | 1000 | 5 | 3 | 4H 30M |
| exceeds expectations | <ANY> | <ANY> | NTE 40.00 442 | 500 | 10 | 5 | 30M |
| FDA approval | BioGen 425 | BGEN 444 | MKT | 500 | 40 475 | 10 485 | CLOSE- 10M |

465

"User10 Transaction Criteria List"

Figure 4

NEWS INDUCED AUTOMATED ELECTRONIC SECURITIES TRANSACTIONS

CROSS REFERENCE TO RELATED APPLICATIONS

This application is a continuation of U.S. Non-Provisional patent application Ser. No. 10/321,124, titled "News Induced Automated Electronic Securities Transactions," filed on 16 Dec. 2002, now U.S. Pat. No. 8,027,893 which claims priority to U.S. Provisional Application No. 60/382,071, titled "High-Speed Token And Phrase Matching Via Successive Complexity Reduction", filed on 20 May 2002, and U.S. Provisional Application No. 60/384,616, titled "Automatic Securities Program Trading Using Tokens Or Match Phrases", filed on 29 May 2002, all of which are hereby fully incorporated by reference.

BACKGROUND OF THE INVENTION

1. Field of the Invention

The invention relates to the field of information processing. More specifically this invention relates to the field of automated electronic securities transactions.

2. Background Information

Traditionally, when wishing to perform securities transactions, a client would contact a broker at the firm with which the client was a member. This broker would act as an agent for the client in facilitating the execution of the trade on the appropriate exchange. The broker, in turn, would be in contact with another agent of the firm that performs the actual trades for the security of interest. For example, in the New York Stock Exchange (NYSE), the agent on the floor is termed the "floor broker". The floor broker will interact with a "stock specialist" for a given stock on the floor of the NYSE. The "stock specialist" is responsible for the ordered trading of that stock. Thus, an interested client would need to communicate the desire to purchase stocks to his/her broker, the broker would need to communicate this, through internal channels in the firm, to the floor broker. The floor broker would, in turn, interact with the specialist to execute the stock trade.

While this traditional model of trading securities is still available, as a result of a number of factors, today's users communicate electronically with the market makers. Thus, today's users interested in trading stocks have the ability to communicate orders directly with the persons responsible for trading of stocks, thus eliminating delays associated with having to go through a "middle man". This electronic trading directly with traders, such as a trading specialist on the NYSE, enables, among other things, the ability of day traders to make money on the swings of the market. The SuperDOT system is an order routing system that allows member firms of the NYSE to transmit orders directly to the "specialist" on the floor. While most individual traders do not have direct access to the SuperDOT system, many brokerage houses have provided "SuperDOT-like" interfaces that allow clients (users) to submit to the brokerage house an order resembling a SuperDOT order. The brokerage house then translates this order to a SuperDOT order for submission to the "specialist".

The NASDAQ also provides the ability for users to trade directly with the market makers. Level II trading information is supplied to users to allow for intelligent decisions. Level II data provides more detailed information about what is currently being bid and asked for securities on the NASDAQ exchange. The users can then use that information to submit requests via Electronic Communications Networks (ECNs) to have their order filled directly by a market maker. Similarly, the user may submit orders via the Small Order Execution System (SOES). Both of these are systems that allow users to have rapid trade times for their orders with various market makers of the NASDAQ market.

Other systems for enabling the real time electronic trading of stock exists on these and other securities exchange systems. Moreover, new systems such as Direct+ and Anonymous SuperDOT are being considered to enable, among other things, a wider variety of entities to communicate directly with trading specialist. Where possible, it is desirable to identify and exploit this expanded, direct real time trading of stocks.

BRIEF DESCRIPTION OF THE DRAWINGS

FIG. 4 illustrates an exemplar list containing a number of user match criteria, including automated execution details.

DETAILED DESCRIPTION OF THE PREFERRED EMBODIMENTS

Figure 1:
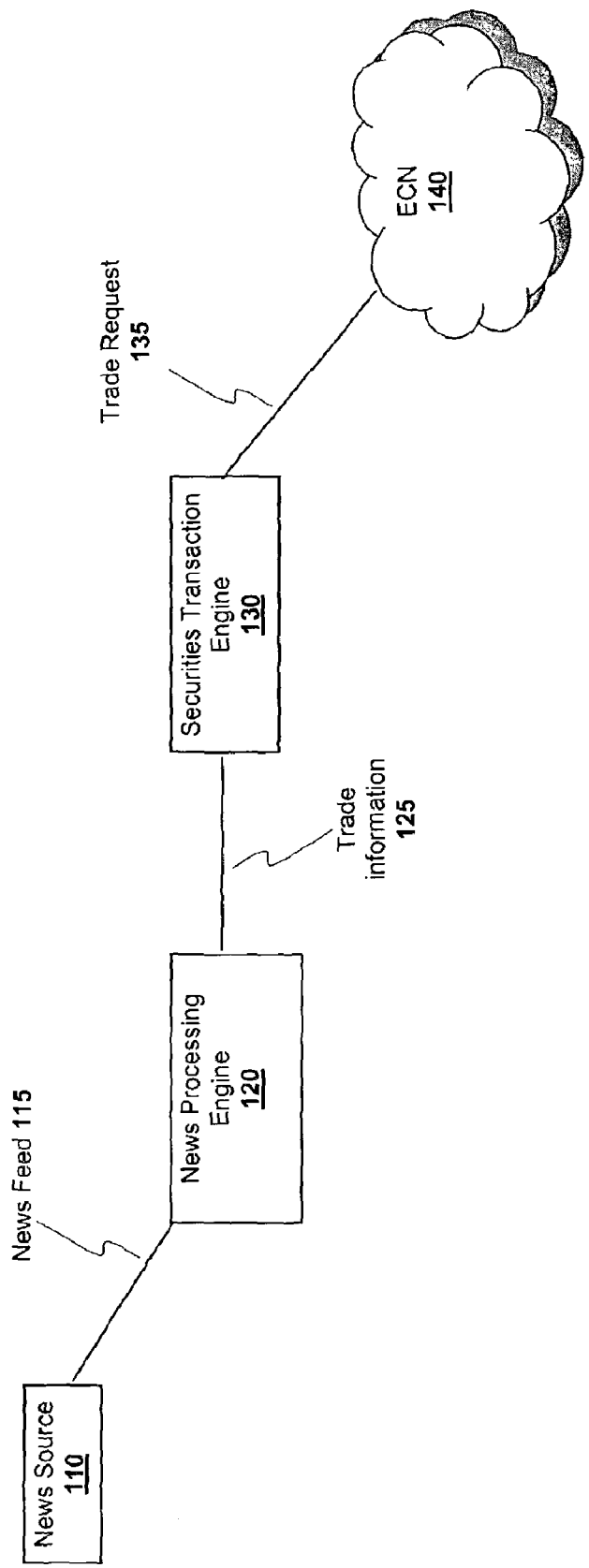
FIG. 1 illustrates a system for performing news based automated securities transactions, in accordance with one embodiment.

News information related to events is received and, by comparing the news information to users criteria, automated securities transactions are advantageously performed. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Many of the examples in this application are provided by way of references to stock transactions, the methods disclosed herein may be applied to the transactions of any securities. In addition, many of today's common electronic stock trading systems such as SuperDOT, ECNs and SOESs are discussed. However, the methods disclosed herein may be applied to the transactions of securities by any compatible electronic means.

Frequently securities are automatically traded as a result of market performance, also known as program trading. For example, a broad-based sell off in technology stocks, as indicated by a precipitous drop of certain technology stock indices, may trigger the automatic disposition of stocks related to the semiconductor industry. However, in addition to the trading of securities as a result of market activity, it is desirable to automatically trade securities as a result of news information. It is desirable to use the ability to trade securities electronically, as previously discussed, based on such news information. For example, an earthquake in Japan causes a shutdown of a number of major component suppliers whose components are used in the manufacture of company ABC's computer servers. Such a shutdown of component suppliers will result in production slowdown, or even halting, of ABC's computer servers. Such a production slowdown, or potential shutdown is exacerbated by today's use of just-in-time manufacturing processes. Corresponding to such a potential production slowdown, there will be a perceived decrease in revenue for company ABC for a period of time. Such an anticipation in decreased revenue can result in a rapid sell-off of company ABC's stock. Thus, to the holder of securities of the company ABC, a rapid, automated disposition of the securities as soon as possible after the occurrence of such a news event is desirable to avoid potential loses as a result of the news event, i.e. the earthquake. By monitoring news stories such as those provided directly by news services or available via other electronic means, near real time automated securities transactions can be performed.

FIG. 1 illustrates a systems for performing automated securities transactions, in accordance with one embodiment. News source 110 is a provider of real time news information. News information, for the purpose of this application, as used herein and in the claims, is information provided on events and happenings in society or the real world in general that are of potential interest to those involved in security market trading, excluding security market performance information such as security market indices and other security market performance metrics. The news source provides a news feed, comprised e.g. of a stream of news articles, to a news processing engine 120. The news processing engine will process news information received via the news feed 115. This news processing involves determining if a news event, associated with an article received via the news feed 115, meets match criteria set up by a user. If the article does meet the match criteria, corresponding trade information 125 is sent to a securities transaction engine 130. The securities transaction engine 130 is responsible for generating a proper securities trade request 135 based on the corresponding trade information 125.

In the embodiment shown, the properly securities trade request is sent to the NASDAQ market via an Electronic Communications Network (ECN) 140.

In various other embodiments, the securities transaction engine is also capable of supporting NYSE stock trade requests. Electronic trades on the NYSE are performed by submitting orders on the SuperDOT (Super Designated Order Turnaround) System. The SuperDOT system facilitates transmission of orders directly to the trading post (e.g. specialist) where the securities are traded on the NYSE. As previously alluded to, only members of the NYSE have access to the SuperDOT system. Frequently brokerages provide to their clients a SuperDOT-like electronic interface. Utilizing this interface, a client can produce a trade request in the SuperDOT-like format of a given broker. Thus, in one embodiment, where the securities transaction engine 130 is run outside of an NYSE member firm, the trade request is formatted for submission to a broker and sent to that broker for submission via the SuperDOT system. In another embodiment, where the securities transaction engine 130 is part of a member NYSE firm, the securities transaction engine 130 will form a proper SuperDOT transaction and submit this transaction to the trading specialist via the SuperDOT system.

Before proceeding to further describe the present invention, it should be noted that the term "securities" as used herein in the specification and in the claims include all forms of tradable financial instruments, including but are not limited to stocks, bonds, options, puts, calls, ADRs, contracts. Further, the term "electronic transactions" refer to transactions conducted over "electronic" systems, which in addition to electronic components may also include mechanical, magnetic and optical components.

Figure 2:
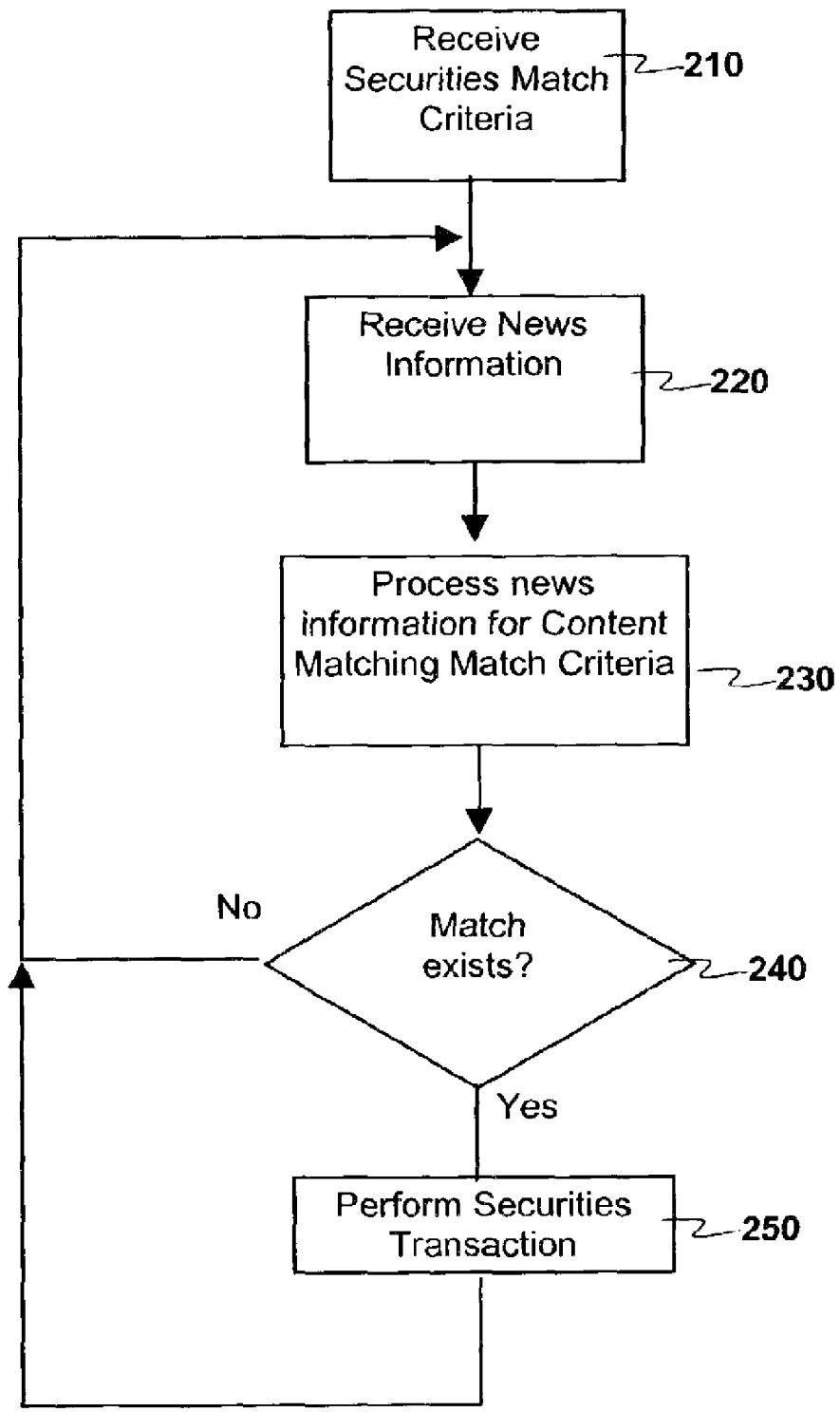
FIG. 2 illustrates a flow diagram for performing news based automated securities transactions, in accordance with one embodiment.

FIG. 2 illustrates a flow diagram for performing news based automated securities transactions, in accordance with one embodiment. Match criteria are received 210 from one or more users of the system. These match criteria provide details on what matched content is required in news information before an automated execution of a securities transaction will occur. In one embodiment, automated execution details of a securities transaction are also provided as part of the match criteria. In another embodiment, the match criteria are provided at 210. In a separate step, automated execution details of a securities transaction are received that correspond to the match criteria previously received. Next, news information, as previously described, is received 220. News information can be a complete news story, for example, a complete Associated Press story containing a news headline and a complete body of a news story. Alternatively, news information may be a synopsis of a news story. In another embodiment, news information comprises a headline for an associated complete news story. The news information is processed to determine if the news information matches one or more match criteria 230, as previously received from the users at 210. If there is a match 240 then securities are transacted 250 as described in the automated execution details. One method of determining matches between news information and match criteria is disclosed in contemporaneously filed U.S. patent application Ser. No. 10/321,127 titled "High-Speed Term and Phrase Matching via Successive Complexity Reduction" and issued as U.S. Pat. No. 7,277,887. Other methods of determining matching between the match criteria and the news information known in the art may be used.

For example, news information is received in the form a headline for a complete news story that reads "ABC, Inc. Declares 2-For-1 Stock Split And Fourth Quarter Cash Dividend". In addition, assume that a user has established match criteria whereby the match criteria comprises the company "ABC, Inc." in association with "2-For-1 Stock Split". Moreover, for this match criteria, the user has specified in the automated execution details that 5000 shares of common stock of the company are to be purchased "at market". During the processing of the news information it is determined that the company "ABC, Inc." is matched in both the match criteria and the news information. In one embodiment, the satisfaction of the match criteria is case sensitive. This can be advantageous when news information and match criteria use a stock symbol that can be a common word in a language. In addition, it is determined that the phrase "2-For-1 Stock Split" is matched in both the match criteria and the news information. This matching of both the company and the phrase satisfies this users match criteria. As a result of the satisfied match criteria, the specified automated execution details are performed and 5000 shares of common stock of ABC, Inc. are purchased at market value.

While for ease of understanding, the above example refers to the trading of the stocks of company ABC in response to news about company ABC, as described earlier, the securities traded may be tradable financial instruments of all types, and the news may be directly or indirectly related to the issuing entity of the security. For example, the news may be "prolonged drought in a particular geographic region", and the security being traded is a grain producing company that is likely to be impacted by the prolonged drought. In other words, the news may be related to a subject matter with potential impact to an entity.

Figure 3:
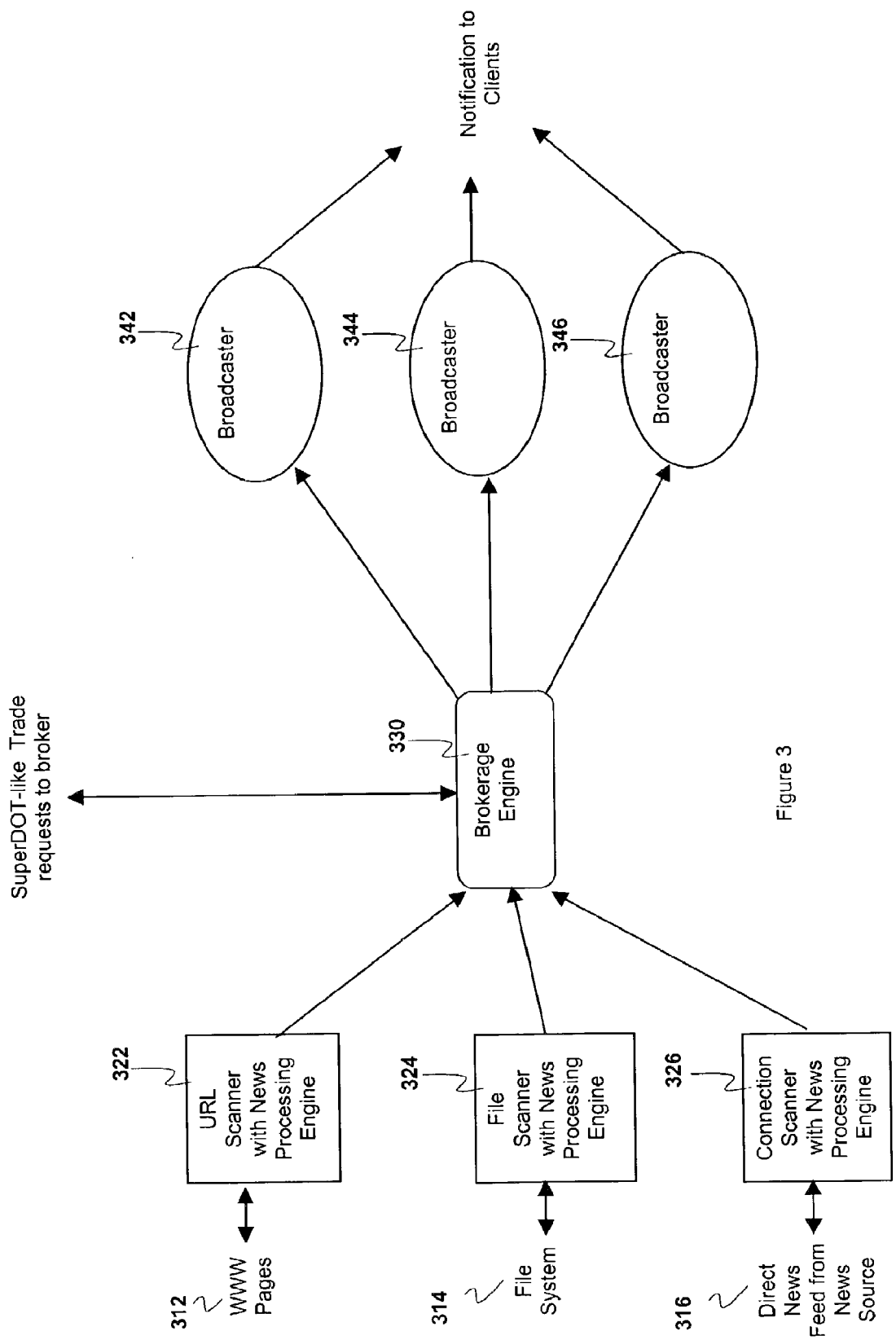
FIG. 3 illustrates an automated securities transaction system in accordance with one embodiment.

FIG. 3 illustrates an automated securities transaction system in accordance with one embodiment. In the disclosed embodiment, multiple news processing engines 322-326 are equipped with various front end scanners for the processing of news information. Such news information is received from a number of news sources 312-316. In this embodiment, the front end scanners are source type specific. For example, one front end scanner with its news processing engine 322 contains a Uniform Resource Locator (URL) scanner. This URL scanner looks at pages from the World Wide Web 312 and checks for changes in links associated with a page. When a change occurs, this page with changed links is processed by the news processing engine. In this embodiment, a second front end scanner, a file scanner, with its news processing engine 324 scans a file system 314. The information on the file system is "pushed" to the file system from a news source (not shown). Also illustrated in FIG. 3 is a third front end scanner, a connection scanner, with news processing engine 326. This connection scanner with news processing engine 326 receives a direct feed from news source 316. Other embodiments (not shown) include the ability of a news processing engine to have more than one scanner. For example, a single news processing engine can have a file scanner for scanning a file system 314 and a connection scanner for receiving a direct feed from a news source 316.

News information 312-314 is obtained from news sources by the front end scanners with news processing engines 322-324. The front end scanners with news processing engines 322-324 determine if match criteria have been satisfied for the transaction of securities, as previously discussed. In one embodiment, each front end scanner with news processing engine receives and maintains its own user match criteria from one or more users. In this embodiment, each news processing engine, upon determination of satisfied match criteria, sends instructions for a corresponding securities transaction to a brokerage engine 330. Brokerage engine 330 then creates a properly formed securities transaction request for delivery to a broker. In this embodiment, the securities transaction is formatted in a broker's SuperDOT-like format and sent to a broker for execution via the SuperDOT system. In another embodiment, each news processing engine contains its own brokerage engine (not shown). In this embodiment, each brokerage engine contains a listing of automated execution details for securities transactions. Thus, the news processing engine can provide an index to a corresponding brokerage engine containing a pointer into the listing. This pointer identifies which automated execution details for securities transactions correspond to the satisfied match criteria. The brokerage engine can then generate a properly formed securities transaction request for sending to a brokerage house's SuperDOT interface. In other embodiments other transaction request formats are utilized. For example, in one embodiment, the brokerage engine generates a properly formed securities transaction request via the Small Order Execution System (SOES) for execution by a Market Maker on the NASDAQ.

Also illustrated in FIG. 3 are number of broadcasters 342-346. In the embodiment illustrated, a number of clients corresponding to the users providing the match criteria are interfaced to the broadcasters 342-346. A broadcaster will have associated with it a number of clients. Once the brokerage engine 330 has sent a trade request to the appropriate electronic trading recipient, the brokerage engine 330 will send a message to the appropriate broadcaster for the client corresponding to the user whose match criteria was satisfied and, thus, whose securities transaction resulted in the sent trade request. The broadcaster will then inform the client of the sent trade request. In another embodiment, the brokerage engine receives trade confirmations back from the appropriate trading entity and forwards the trade confirmation to the appropriate user through the broadcasters 342 346.

FIG. 4 illustrates an exemplar list containing a number of user match criteria, including automated execution details. The rows in the table illustrate separate match criteria for a user, in this case user10 The first column illustrates the various user match criteria against which news information is checked 410. The following two columns 420 430 in the table indicate the company to which the match criteria apply. In the case of the first two rows, the corresponding user match criteria apply to any company. The fourth column specifies the price at which the securities for the company are to be purchased 440. For example, in the third row, the securities are to be purchased at market value 442. In the second row, however, a not-to-exceed amount 444 is placed on the price at which the securities are to be purchased. The fifth column specifies the number of shares to be purchased 450. The remaining columns specify the criteria upon which the securities are to be sold. The sixth column specifies the upper percentage limit on the stock price increase at which the security should be sold 460. For example, in the first row's transaction criteria, the security should be sold if it increases in value by 5% from the purchase price 465. The seventh column specifies the percentage loss limit on the stock price at which the security should be sold 470. For example, in the first row's transaction criteria, the security should be sold if it decreases in value by 3% from the purchase price 475. Such a limit can be used to minimize losses in the cases where the market does not react as expected to the news. The final column indicates a time at which the stock should be sold, if the two previously mentioned conditions have not been met 480. For example, in the first row's transaction criteria, the stock should be sold after 4 hours and 30 minutes if it has not increased by 5% or decreased by 3% from the time it was purchased 485. This set of transaction criteria for the processing of the securities is exemplary and not intended to limit in any manner. Others types of investment exercises such as options purchases and sales as well as shorts sales are possible.

Figure 5:
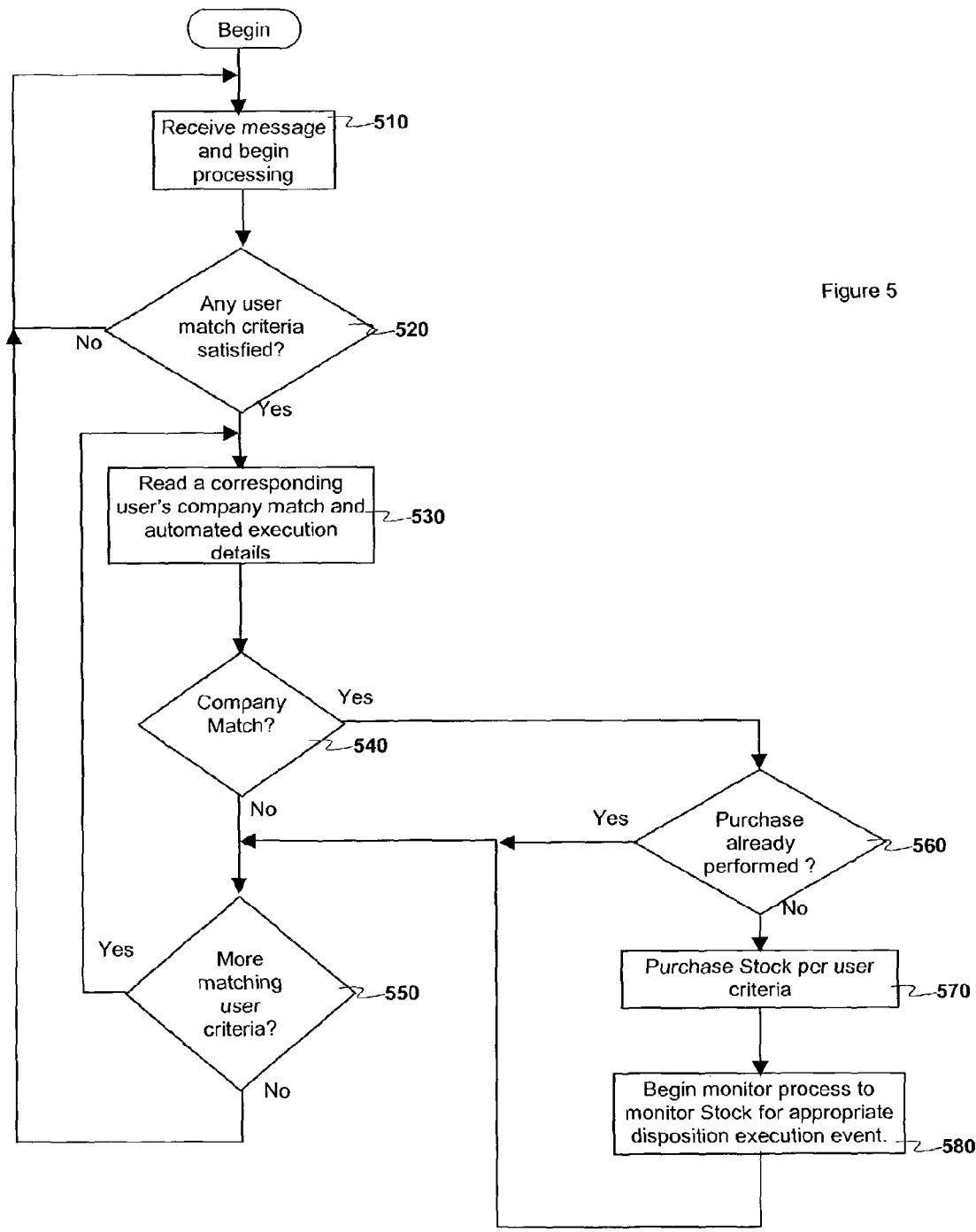
FIG. 5 illustrates a flow diagram associated with the processing of news information, in accordance with one embodiment.

FIG. 5 illustrates a flow diagram associated with the processing of news information, in accordance with one embodiment. In the embodiment shown, a term or phrase match is processed against the news information separate from the company match. The flow diagram illustrated will be described in association with the match criteria and automated execution details illustrated in FIG. 4 as well as the trading system illustrated in FIG. 3. For this discussion, assume however that each news processing engine contains a composite user criteria list (not shown) for that news processing engine.

Assume also that a connection scanner with a news processing engine 326 obtains news information comprising a message from a direct news feed 316. Further assume that the message contains the text "XYZ Corporation Announces Stock Split". The composite user criteria list associated with news processing engine 326 contains, among criteria from other users, the match criteria of user10 illustrated in FIG. 4.

Note that among other phrases in this composite user criteria list, the phrase "Stock Split" is associated with user10.

Upon receipt of the message "XYZ Corporation Announces Stock Split", a check is made of all user criteria to determine if there is a match of any user criteria to the message 520. If no user match criteria is satisfied by the message, then another message is processed. However, in the embodiment shown, User10's match criteria contains a match phrase, "Stock Split", which does match the message. Upon determination that a user match criteria is satisfied, the corresponding users company match and automated execution details are read 530. The company match is checked 540. If a company associated with the match criteria is also found in the message, then further processing of the automated execution details occurs. In this case, the company match is to ANY company and thus XYZ corporation results in continued processing.

The automated execution details for this match criteria indicate a purchase of 1000 shares of stock at market value. In this embodiment, after a company match is determined, a check is made to determine if a previous purchase of shares of common stock of XYZ has occurred 560 as a result of the same news information, perhaps processed by some other news processing engine. If so, a purchase does not occur. If, however, no purchase has been made based on this information, 1000 shares of XYZ corporation are purchased at market price 570. After the purchase is performed, a monitor process will be started for tracking the 1000 purchased shares 580. It will then be determined if there are more users with matching criteria 550 and, if there are, process those users' match criteria as discussed. If not, further news information will be processed.

Figure 6:
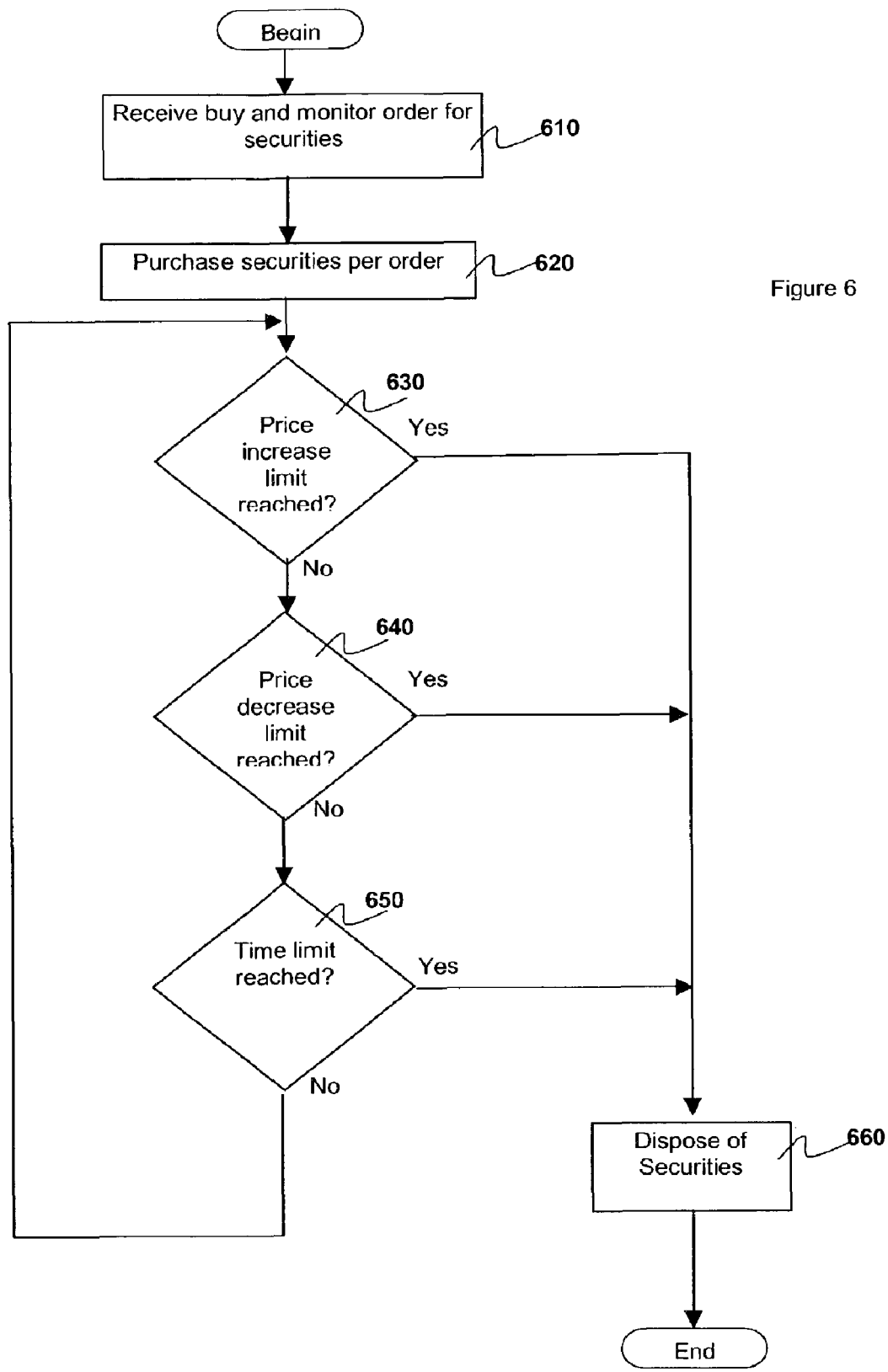
FIG. 6 illustrates a purchase and monitoring process in accordance with one embodiment.

FIG. 6 illustrates a purchase and monitoring process of a brokerage engine in accordance with one embodiment. Once a determination is made by a news processing engine that a securities purchase is to be made, a process for purchasing and monitoring the securities is established. The process receives the automated execution details including buy information and a set of monitor criteria for the noted securities 610. The process purchases the securities as indicated in the buy order 620. This is performed as previously discussed whereby the process formats an order for electronic purchase. The order is then sent via the appropriate network. The process will monitor for an acknowledgement of the order from the appropriate market maker or specialist. The process then monitors the current price of the stock in addition to the elapsed time since the securities were purchased. If the stock price rises by a predetermined amount 630, the process sells the securities 660. Similarly, if a loss amount is specified, then if the stock price drops by the loss amount 640, the process sells the securities 660 to minimize the loss. Finally, if a time limit is specified 650, and the other criteria 630 640 have not yet been satisfied, the process sells the securities 660.

Thus, a method of performing automated securities transaction as a result of news information has been described. While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A method comprising:
receiving, with an automated programmed electronic computer from a user via a user interface, match criteria;
receiving, by the automated programmed electronic computer from the user via the user interface, automated execution details associated with the match criteria;
receiving, by the automated programmed electronic computer from an electronic news source, news information;
determining, by the automated programmed electronic computer, a portion of the news information matches the match criteria, wherein the portion excludes security market performance information; and
sending, by the automated programmed electronic computer based on the automated execution details, a trade request for a trade of securities, said sending of the trade request based on said determining that the portion of said news information matches the match criteria.

2. The method of claim 1, further comprising:
generating an electronic securities transaction request to effect the trade of securities; and
submitting the electronic securities transaction request via an electronic network.

3. The method of claim 1, wherein the news source is a news service.

4. The method of claim 1, further comprising:
receiving the news information via a network.

5. The method of claim 1, wherein the match criteria includes an indication of a company and the request is for a trade of securities related to the company.

6. The method of claim 5, further comprising scheduling an automatic disposition of securities transacted as a result of the request.

7. The method of claim 6, wherein the scheduling of an automatic disposition of the securities is performed within parameters received from the user along with the match criteria.

8. The method of claim 1, wherein the generating of the electronic securities transaction request occurs upon further determining that a prior trading of securities has not already occurred based on an event associated with the news information.

9. The method of claim 1, wherein the match criteria includes one or more tokens.

10. The method of claim 9, wherein the match criteria includes a plurality of tokens in a predetermined order.

11. The method of claim 9, wherein the one or more tokens include a word, a number, or a symbol.

12. A method comprising:
receiving, by an automated programmed electronic computer from a user via a user interface, match criteria associated with a subject matter;
receiving, by the automated programmed electronic computer from the user via the user interface, automated execution details associated with the match criteria and a company;
receiving, by the automated programmed electronic computer from an electronic news source, news information containing a reference to the subject matter and being only indirectly related to the company;
determining, by the automated programmed electronic computer, the news information includes a token that matches the match criteria; and
sending, by the automated programmed electronic computer, an electronic trade request based on the automated execution details, said sending of the electronic trade request based on said determining that the news information includes the token that matches the match criteria.

13. The method of claim 12, further comprising scheduling an automatic disposition of securities transacted as a result of the electronic trade request.

14. The method of claim 12, wherein the match criteria includes a plurality of tokens in a predetermined order and said determining comprises:
determining the news information includes the plurality of tokens in the predetermined order.

15. The method of claim 12, further comprising:
receiving match criteria from each of a plurality of users,
generating a composite user criteria list including the match criteria from each of the plurality of users; and
said determining that said news information includes a token that matches the match criteria includes comparing the news information to the composite user criteria list.

16. A method comprising:
receiving, by an automated programmed electronic computer from a user via a user interface, match criteria;
receiving, by the automated programmed electronic computer from the user via the user interface, automated execution details associated with the match criteria and a company;
receiving, by the automated programmed electronic computer from an electronic news source, a press release from the company;
determining, by the automated programmed electronic computer, the press release includes one or more tokens that matches the match criteria; and
sending, by the automated programmed electronic computer, a request to trade securities related to the company based on the automated execution details, said sending the request based upon said determining that said press release includes the one or more tokens that matches the match criteria.

17. The method of claim 16, wherein said receiving the press release comprises:
receiving the press release from a news service that publishes the press release.

18. The method of claim 16, further comprising:
monitoring performance of securities acquired as a result of the request; and
sending an additional request to sell at least a portion of the acquired securities based on said monitoring.

19. The method of claim 16, further comprising:
receiving match criteria from each of a plurality of users,
generating a composite user criteria list including the match criteria from each of the plurality of users; and
said determining that said press release includes one or more tokens that match the match criteria includes comparing the news information to the composite user criteria list.

20. An article of manufacture having one or more non-transitory computer readable media storing instructions that, when executed by a processor, cause an electronic transaction system to:
receive, from a user via a user interface, match criteria;
receive, from the user via the user interface, automated execution details associated with the match criteria;
receive, from an electronic news source, news information;
determine a portion of the news information matches the match criteria, wherein the portion excludes security market performance information; and
send, based on the automated execution details, a trade request for a trade of securities to a transaction engine, said sending of the trade request based on said determining that the portion of said news information matches the match criteria.

21. The article of manufacture of claim 20, wherein the instructions, when executed, further cause the electronic transaction system to:
generate an electronic securities transaction request to effect the trade of securities; and
submit the electronic securities transaction request via an electronic network.

22. The article of manufacture of claim 20, wherein the instructions, when executed, further cause the electronic transaction system to:
schedule an automatic disposition of the securities within parameters received from the user along with the match criteria.

23. The article of manufacture of claim 20, wherein the instructions, when executed, further cause the electronic transaction system to:
determine that a prior trading of securities has not already occurred based on an event associated with the news information;
wherein the generation of the electronic securities transaction request occurs upon the determination that a prior trading of securities has not already occurred based on an event associated with the news information.

24. The article of manufacture of claim 20, wherein:
the match criteria includes a plurality of tokens in a predetermined order, and
the one or more tokens include a word, a number, or a symbol.

* * * * *